United States Patent
Yamada et al.

(10) Patent No.: US 10,081,256 B2
(45) Date of Patent: Sep. 25, 2018

(54) VEHICLE COMPRISING ELECTRONIC CONTROL UNIT CONFIGURED TO CONTROL INVERTER BY SWITCHING PWM CONTROL

(71) Applicant: Toyota Jidosha Kabushiki Kaisha, Toyota-shi Aichi-ken (JP)

(72) Inventors: Kenji Yamada, Komaki (JP); Toshihiro Yamamoto, Toyohashi (JP); Masashi Mizuno, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/495,266

(22) Filed: Apr. 24, 2017

(65) Prior Publication Data
US 2017/0313198 A1    Nov. 2, 2017

(30) Foreign Application Priority Data
Apr. 28, 2016    (JP) .................................. 2016-091164

(51) Int. Cl.
*B60L 11/18*    (2006.01)
*H02P 6/08*    (2016.01)
(Continued)

(52) U.S. Cl.
CPC .......... *B60L 11/1803* (2013.01); *B60L 3/003* (2013.01); *B60L 11/123* (2013.01); *B60L 11/14* (2013.01);
(Continued)

(58) Field of Classification Search
CPC .. B60L 11/1803; B60L 2210/40; H02P 6/085; H02P 6/18
See application file for complete search history.

(56) References Cited

U.S. PATENT DOCUMENTS

2008/0218111 A1* 9/2008 Okamura ............ H02P 21/0089
                                                                    318/453
2009/0115362 A1* 5/2009 Saha ........................ B60K 6/26
                                                                    318/400.09
(Continued)

FOREIGN PATENT DOCUMENTS

JP    2011-024349 A    2/2011
JP    2011-061921 A    3/2011
(Continued)

*Primary Examiner* — Muhammad S Islam
(74) *Attorney, Agent, or Firm* — Dinsmore & Shohl LLP

(57) ABSTRACT

A vehicle includes an electronic control unit. The electronic control unit is configured to perform control of an inverter by switching a plurality of controls including i) first PWM control of generating a first PWM signal of a plurality of switching elements by comparison of voltage commands of respective phases based on a torque command of a motor with a carrier voltage and switching the plurality of switching elements, and ii) second PWM control of generating a second PWM signal of the plurality of switching elements based on a modulation factor of a voltage and a voltage phase based on the torque command and the number of pulses in a predetermined period of an electrical angle of the motor and switching the plurality of switching elements. The electronic control unit is configured to limit execution of the second PWM control when an abnormality occurs in the rotational position sensor.

6 Claims, 3 Drawing Sheets

(51) Int. Cl.
*H02P 6/18* (2016.01)
*B60L 3/00* (2006.01)
*B60L 11/12* (2006.01)
*B60L 11/14* (2006.01)

(52) U.S. Cl.
CPC ............. *H02P 6/085* (2013.01); *H02P 6/18* (2013.01); *B60L 2210/40* (2013.01); *B60L 2220/14* (2013.01); *B60L 2240/421* (2013.01); *B60L 2240/423* (2013.01); *B60L 2240/527* (2013.01); *B60L 2240/529* (2013.01); *B60L 2260/165* (2013.01); *Y02T 10/7258* (2013.01)

(56) References Cited

U.S. PATENT DOCUMENTS

| | | | |
|---|---|---|---|
| 2010/0045268 A1* | 2/2010 | Kilian | H03K 19/18 324/207.2 |
| 2012/0153936 A1* | 6/2012 | Romani | G01R 33/0035 324/202 |
| 2012/0173066 A1* | 7/2012 | Yamada | B60L 11/1803 701/22 |
| 2013/0200830 A1 | 8/2013 | Suzuki et al. | |
| 2014/0225536 A1* | 8/2014 | Yamada | B60L 15/02 318/51 |
| 2016/0329849 A1 | 11/2016 | Nakajima et al. | |

FOREIGN PATENT DOCUMENTS

| | | |
|---|---|---|
| JP | 2013162660 A | 8/2013 |
| WO | 2015166546 A1 | 11/2015 |

* cited by examiner

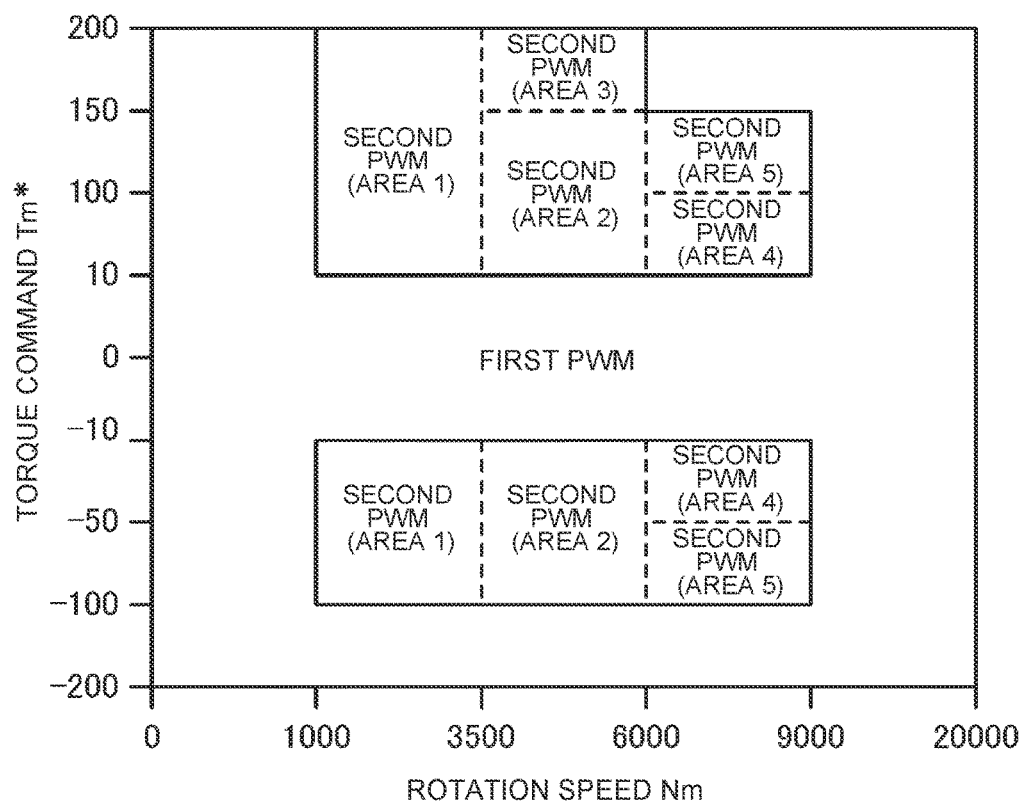
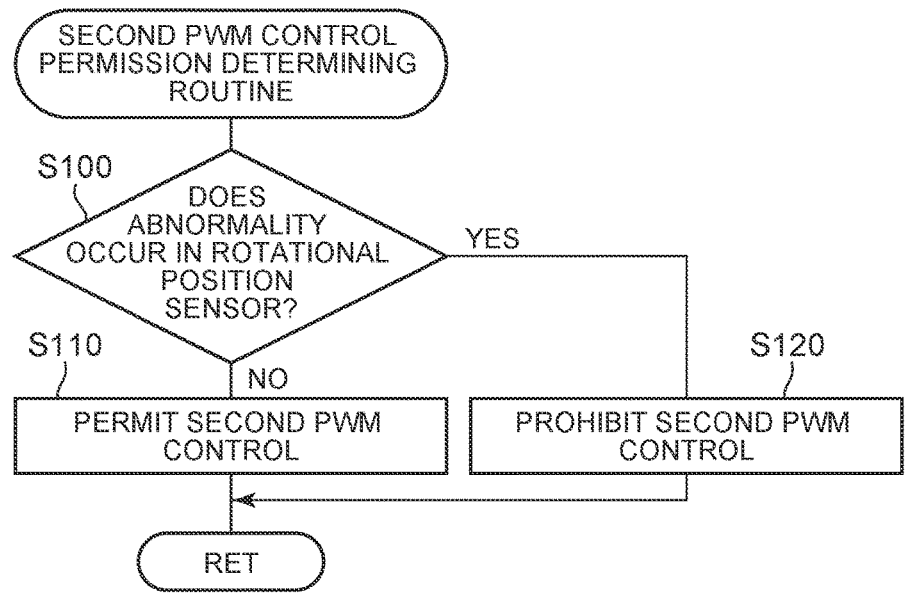

VEHICLE COMPRISING ELECTRONIC CONTROL UNIT CONFIGURED TO CONTROL INVERTER BY SWITCHING PWM CONTROL

CROSS-REFERENCE TO RELATED APPLICATIONS

This application claims priority to Japanese Patent Application No. 2016-091164 filed on Apr. 28, 2016, the entire contents of which are incorporated herein by reference.

BACKGROUND

1. Technical Field

The disclosure relates to a vehicle and more particularly to a vehicle including a motor, an inverter, and a battery.

2. Description of Related Art

As such a type of vehicle, a vehicle which includes an electric motor and a power conversion device having an inverter circuit that drives the electric motor by switching a plurality of switching elements and in which pulse signals of the plurality of switching elements are generated based on the number of pulses in one electrical period of the electric motor and a modulation factor of a voltage and a voltage phase based on a torque command of the electric motor to switch the plurality of switching elements has been proposed (for example, see Japanese Patent Application Publication No. 2013-162660 (JP 2013-162660 A). In such a vehicle, loss reduction in a drive system including the power conversion device and the electric motor as a whole is achieved by generating pulse signals to minimize power loss of the power conversion device and the electric motor based on the number of pulses, the modulation factor, and the voltage phase.

SUMMARY

However, in the technique of generating pulse signals and outputting the pulse signals to the power conversion device in the above-mentioned vehicle, a period in which the pulse signals are generated is longer and responsiveness (trackability of an operating point when a target operating point changes) of the electric motor is lower in comparison with a technique of generating pulse signals by comparison of voltage commands of respective phases of the electric motor with a carrier voltage and outputting the pulse signals to the power conversion device. Accordingly, when an abnormality occurs in a rotational position sensor that detects a rotational position of a rotor of the electric motor, an overcurrent or an overvoltage is likely to occur in the inverter.

The disclosure provides a vehicle that can prevent an overcurrent or an overvoltage from occurring in an inverter.

A vehicle according to a first aspect of the disclosure includes a motor configured to drive the vehicle, an inverter configured to drive the motor by switching a plurality of switching elements, a battery configured to exchange power with the motor via the inverter, a rotational position sensor configured to detect a rotational position of a rotor of the motor, and an electronic control unit. The electronic control unit is configured to perform control of the inverter by switching a plurality of controls including first PWM control of generating a first PWM signal of the plurality of switching elements by comparison of voltage commands of respective phases based on a torque command of the motor with a carrier voltage and switching the plurality of switching elements, and second PWM control of generating a second PWM signal of the plurality of switching elements based on a modulation factor of a voltage and a voltage phase based on the torque command and the number of pulses in a predetermined period of an electrical angle of the motor and switching the plurality of switching elements. The electronic control unit is configured to limit execution of the second PWM control when an abnormality occurs in the rotational position sensor.

In the vehicle according to the aspect, control of the inverter is performed by switching the plurality of controls including the first PWM control and the second PWM control. The first PWM control is control of generating a first PWM signal by comparison of the voltage commands of respective phases based on the torque command of the motor with the carrier voltage and switching the plurality of switching elements of the inverter. The second PWM control is control of generating a second PWM signal based on a modulation factor of a voltage and a voltage phase based on the torque command of the motor and the number of pulses in a predetermined period of an electrical angle of the motor and switching the plurality of switching elements of the inverter. When an abnormality occurs in the rotational position sensor that detects the rotational position of the rotor of the motor, execution of the second PWM control is limited. In the second PWM control, a period in which the pulse signals are generated is longer and responsiveness of the electric motor is lower in comparison with the first PWM control. Accordingly, when an abnormality occurs in the rotational position sensor, an overcurrent or an overvoltage is likely to occur in the inverter. As a result, it is possible to prevent an overcurrent or an overvoltage from occurring in the inverter by limiting execution of the second PWM control when an abnormality occurs in the rotational position sensor. Here, the "limiting of execution of the second PWM control" includes reduction of an execution range of the second PWM control or prohibition of the second PWM control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a diagram illustrating an example of a relationship between a target operating point of a motor and areas of first and second PWM controls;

FIG. 3 is a flowchart illustrating an example of a second PWM control permission determining routine which is performed by an electronic control unit according to the embodiment.

DETAILED DESCRIPTION OF EMBODIMENTS

Hereinafter, an embodiment of the disclosure will be described with reference to an example.

Figure 1:
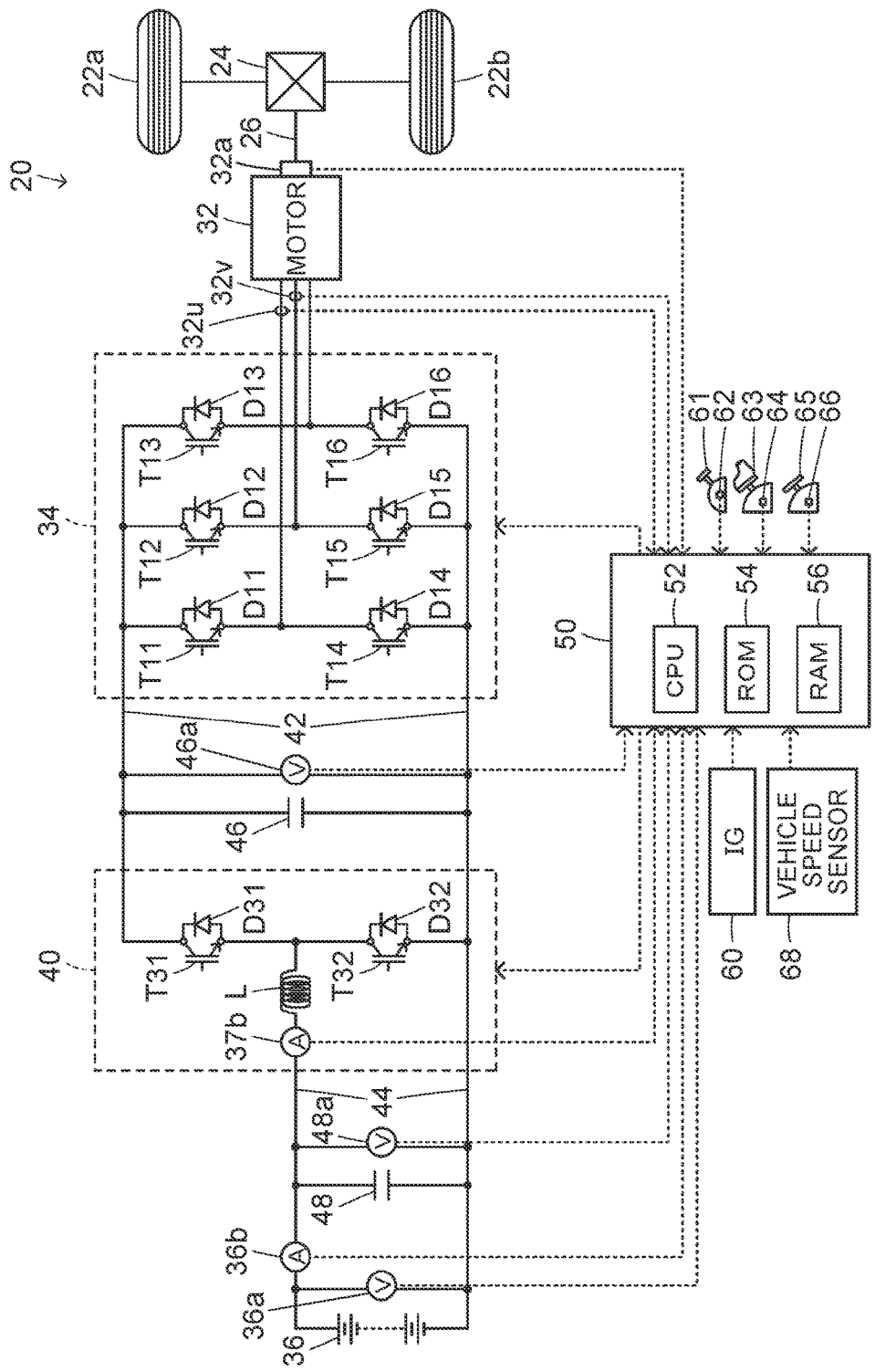
FIG. 1 is a diagram schematically illustrating a configuration of an electric vehicle according to an embodiment of the disclosure.

FIG. 1 is a diagram schematically illustrating a configuration of an electric vehicle 20 according to an embodiment of the disclosure. The electric vehicle 20 according to the embodiment includes a motor 32, an inverter 34, a battery 36, a boost converter 40, and an electronic control unit 50 as illustrated in the drawing.

The motor 32 is constituted by a synchronous generator-motor and includes a rotor in which a permanent magnet is embedded and a stator on which a three-phase coil is wound. The rotor of the motor 32 is connected to a drive shaft 26 which is connected to driving wheels 22a and 22b via a differential gear 24.

The inverter 34 is connected to the motor 32 and is also connected to the boost converter 40 via a high-voltage power line 42. The inverter 34 includes six transistors T11 to T16 and six diodes D11 to D16. The transistors T11 to T16 are arranged as pairs of two transistors to serve as a source side and a sink side with respect to a positive bus bar and a negative bus bar of the high-voltage power line 42. The six diodes D11 to D16 are connected in reverse parallel to the transistors T11 to T16, respectively. The three-phase coil (a U phase, a V phase, and a W phase) of the motor 32 is connected to junction points between the transistors constituting the pairs of the transistors T11 to T16. Accordingly, when a voltage is applied to the inverter 34, a rotating magnetic field is formed in the three-phase coil and the motor 32 is rotationally driven by causing the electronic control unit 50 to adjust a ratio of ON-time of each pair of transistors T11 to T16. Hereinafter, the transistors T11 to T13 may be referred to as an "upper arm" and the transistors T14 to T16 may be referred to as a "lower arm." A smoothing capacitor 46 is connected to the positive bus bar and the negative bus bar of the high-voltage power line 42.

The battery 36 is constituted by, for example, a lithium ion secondary battery or a nickel hydrogen secondary battery and is connected to the boost converter 40 via a low-voltage power line 44. A smoothing capacitor 48 is connected to a positive bus bar and a negative bus bar of the low-voltage power line 44.

The boost converter 40 is connected to the high-voltage power line 42 and the low-voltage power line 44. The boost converter 40 includes two transistors T31 and T32, two diodes D31 and D32, and a reactor L. The transistor T31 is connected to the positive bus bar of the high-voltage power line 42. The transistor T32 is connected to the transistor T31 and the negative bus bars of the high-voltage power line 42 and the low-voltage power line 44. The two diodes D31 and D32 are connected in reverse parallel to the transistors T31 and T32, respectively. The reactor L is connected to a junction point between the transistors T31 and T32 and the positive bus bar of the low-voltage power line 44. By causing the electronic control unit 50 to adjust a ratio of ON-time of the transistors T31 and T32, the boost converter 40 supplies power of the low-voltage power line 44 to the high-voltage power line 42 with step-up of a voltage or supplies power of the high-voltage power line 42 to the low-voltage power line 44 with step-down of a voltage.

The electronic control unit 50 is constituted as a microprocessor including a CPU 52, and includes a ROM 54 storing a processing program, a RAM 56 temporarily storing data, and an input and output port in addition to the CPU 52.

Signals from various sensors are input to the electronic control unit 50 via the input port. Examples of the signals input to the electronic control unit 50 include a rotational position θm from a rotational position sensor 32a (for example, a resolver) that detects rotational position of the rotor of the motor 32 and phase currents Iu and Iv from current sensors 32u and 32v that detect currents flowing in the phases of the motor 32. Examples of the input signals further include a voltage VB from a voltage sensor 36a connected between terminals of the battery 36, a current IB from a current sensor 36b connected to an output terminal of the battery 36 and a reactor current IL from a current sensor 37b connected to a reactor L. Examples of the input signals further include a voltage VH of the capacitor 46 (the high-voltage power line 42) from a voltage sensor 46a connected between terminals of the capacitor 46 and a voltage VL of the capacitor 48 (the low-voltage power line 44) from a voltage sensor 48a connected between terminals of the capacitor 48. Examples of the input signals further include an ignition signal from an ignition switch 60, a shift position SP from a shift position sensor 62 that detects an operation position of a shift lever 61, an accelerator opening Acc from an accelerator pedal position sensor 64 that detects a degree of stepping on an accelerator pedal 63, and a brake pedal position BP from a brake pedal position sensor 66 that detects a degree of stepping on a brake pedal 65. Examples of the input signals further include a vehicle speed VS from a vehicle speed sensor 68.

Various control signals are output from the electronic control unit 50 via the output port. Examples of the signal output from the electronic control unit 50 include switching control signals to the transistors T11 to T16 of the inverter 34 and switching control signals to the transistors T31 and T32 of the boost converter 40.

The electronic control unit 50 computes an electrical angle θe and a rotation speed Nm of the motor 32 based on the rotational position θm of the rotor of the motor 32 from the rotational position sensor 32a. The electronic control unit 50 computes a state of charge (SOC) of the battery 36 based on an integrated value of the current IB of the battery 36 from the current sensor 36b. Here, the SOC is a ratio of power capacity dischargeable from the battery 36 to the total capacity of the battery 36.

In the electric vehicle 20 according to the embodiment having the above-mentioned configuration, the electronic control unit 50 performs the following travel control. In the travel control, a required torque Td* required for a drive shaft 26 is set based on the accelerator opening Acc and the vehicle speed VS, the set required torque Td* is set as a torque command Tm* of the motor 32, and switching control of the transistors T11 to T16 of the inverter 34 is performed to drive the motor 32 in accordance with the torque command Tm*. A target voltage VH* of the high-voltage power line 42 is set to drive the motor 32 in accordance with the torque command Tm* and switching control of the transistors T31 and T32 of the boost converter 40 is performed such that the voltage VH of the high-voltage power line 42 reaches the target voltage VH*.

Control of the inverter 34 will be described below. In the embodiment, as the control of the inverter 34, any one of sinusoidal pulse width modulation (PWM) control, overmodulation PWM control, and rectangular wave control is performed. The sinusoidal PWM control is control of controlling the inverter 34 to apply (supply) a pseudo three-phase AC voltage to the motor 32, the overmodulation PWM control is control of controlling the inverter 34 to apply an overmodulation voltage to the motor 32, and the rectangular wave control is control of controlling the inverter 34 to apply a rectangular wave voltage to the motor 32. When the sinusoidal PWM control is performed and a pulse width modulation voltage based on a sinusoidal wave voltage is used as the pseudo three-phase AC voltage, a modulation factor Rm has a value ranging from 0 to about 0.61. When a pulse width modulation voltage based on a superimposed voltage acquired by superimposing 3n-th (for example, third) harmonic voltages on the sinusoidal wave voltage is used as the pseudo three-phase AC voltage, the modulation factor Rm has a value ranging from 0 to about 0.71. The modulation factor Rm is a ratio of an effective value of an output voltage of the inverter 34 (a voltage applied to the motor 32) to an input voltage (the voltage VH of the high-voltage power line 42). In the embodiment, in order to enlarge the range of the modulation factor Rm in which the sinusoidal PWM control can be performed, it is assumed that the pulse width modulation voltage based on the superimposed voltage is used as the pseudo three-phase AC voltages. When the rectangular wave control is performed, the modulation factor Rm has a value of about 0.78. In the embodiment, in consideration thereof, it is assumed that any one of the sinusoidal PWM control, the overmodulation PWM control, and the rectangular wave control is performed based on the modulation factor Rm. The sinusoidal PWM control will be described below. Neither overmodulation control nor rectangular wave control is essential to the disclosure and thus detailed description thereof will not be made.

In the embodiment, first PWM control or second PWM control is performed as the sinusoidal PWM control. The first PWM control is control of generating a first PWM signal of the transistors T11 to T16 to switch the transistors T11 to T16 by comparing voltage commands Vu*, Vv*, and Vw* of the phases of the motor 32 with a carrier voltage (a triangular wave voltage). The second PWM control is control of generating a second PWM signal of the transistors T11 to T16 based on the modulation factor Rm of a voltage, a voltage phase θp, and the number of pulses Np in a predetermined period (for example, half a period or one period of an electrical angle θe of the motor 32) to switch the transistors T11 to T16. It is assumed that the first PWM signal is generated at an interval Δt1 corresponding to half a period or one period of the carrier voltage (a triangular wave voltage with a frequency of 3 kHz to 5 kHz) when the first PWM control is performed, and the second PWM signal is generated at an interval Δt2 longer than the interval Δt1 when the second PWM control is performed.

When the first PWM control is performed, the generation period of the PWM signal can be set to be shorter than when the second PWM control is performed, and thus the responsiveness (adherence to an operating point when a target operating point changes) of the motor 32 can be improved. When the second PWM control is performed, it is possible to reduce a core loss of the motor 32 or to reduce harmonic component by generating the second PWM signal to reduce (for example, to minimize) the core loss of the motor 32 or generating the second PWM signal to reduce (for example, to minimize) harmonic component of a voltage or a current (particularly, low-order harmonic component such as rotational sixth harmonic component and rotational twelfth harmonic component of the motor 32), in comparison with the case in which the first PWM control is performed.

In the embodiment, it is assumed that an area in which an effect of execution of second PWM control can be expected to a certain extent is determined as a second PWM control area and an area in which the effect cannot be expected to the certain extent is determined as a first PWM control area to improve responsiveness of a motor 32, based on an experiment result or an analysis result of performing the first PWM control and the second PWM control on target operating points of the motor 32. FIG. 2 is a diagram illustrating an example of a relationship between the target operating points of the motor 32 and the first PWM control area and the second PWM control area. In the example illustrated in FIG. 2, an area (Area 1) in which a rotation speed Nm of the motor 32 ranges from 1000 rpm to 3500 rpm, and either a torque command Tm* thereof is equal to or greater than 10 Nm or the torque command Tm* ranges from −100 Nm to −10 Nm, an area (Area 2) in which the rotation speed Nm of the motor 32 ranges from 3500 rpm to 6000 rpm, and either the torque command Tm* ranges from 10 Nm to 150 Nm or the torque command Tm* ranges from −100 Nm to −10 Nm, an area (Area 3) in which the rotation speed Nm of the motor 32 ranges from 3500 rpm to 6000 rpm, and either the torque command Tm* is equal to or greater than 150 Nm, an area (Area 4) in which the rotation speed Nm of the motor 32 ranges from 6000 rpm to 9000 rpm, and either the torque command Tm* ranges from 10 Nm to 100 Nm or the torque command Tm* ranges from −50 Nm to −10 Nm, and an area (Area 5) in which the rotation speed Nm of the motor 32 ranges from 6000 rpm to 9000 rpm, and either the torque command Tm* ranges from 100 Nm to 150 Nm or the torque command Tm* ranges from −100 Nm to −50 Nm are set as the second PWM control area. An area other than the second PWM control area is set as the first PWM control area. Here, the areas have different numbers of pulses in the second PWM control area.

An operation of an electric vehicle 20 according to the embodiment having the above-mentioned configuration, particularly, an operation when the sinusoidal PWM control is performed in a case where an abnormality occurs in the rotational position sensor 32a detecting a rotational position of the rotor of the motor 32, will be described below. FIG. 3 is a flowchart illustrating an example of a second PWM control permission determining routine which is performed by an electronic control unit 50 according to the embodiment. This routine is repeatedly performed.

When the second PWM control permission determining routine is performed, the electronic control unit 50 first determines whether an abnormality occurs in the rotational position sensor 32a detecting a rotational position of the rotor of the motor 32 (Step S100). This determination can be performed, for example, by storing a determination result of whether an abnormality (malfunction) occurs in a sensor through an abnormality determining routine which is not illustrated in a predetermined area of a RAM 56 and checking whether an abnormality occurs in the predetermined area of the RAM 56.

When no abnormality occurs in the rotational position sensor 32a, the second PWM control is permitted (Step S110) and the routine ends. In this case, the first PWM control and the second PWM control are switched and performed based on the areas illustrated in FIG. 2.

On the other hand, when an abnormality occurs in the rotational position sensor 32a, execution of the second PWM control is prohibited (Step S120) and the routine ends. In this case, when the second PWM control is executed, execution of the second PWM control can be switched to execution of the first PWM control. As described above, in the second PWM control, a period in which pulse signals are generated is longer and the responsiveness of the motor 32 is lower. Accordingly, when an abnormality occurs in the rotational position sensor 32a, an overcurrent or an overvoltage is likely to occur in the inverter 34. However, by prohibiting execution of the second PWM control and executing the first PWM control, it is possible to improve the responsiveness of the motor 32 and to prevent an overcurrent or an overvoltage from occurring in the inverter 34.

In the above-mentioned electric vehicle 20 according to the embodiment, when an abnormality occurs in the rotational position sensor 32a detecting the rotational position of the rotor of the motor 32, execution of the second PWM control is prohibited. Accordingly, it is possible to prevent an overcurrent or an overvoltage from occurring in the inverter 34.

In the electric vehicle 20 according to the embodiment, when an abnormality occurs in the rotational position sensor 32a detecting the rotational position of the rotor of the motor 32, execution of the second PWM control is prohibited, but execution of the second PWM control may be limited. For example, execution of the second PWM control in the area other than Area 1 in the second PWM control area illustrated in FIG. 2 may be prohibited or execution of the second PWM control in a case other than the case in which the electric vehicle cruises and travels in the second PWM control area may be prohibited. In this case, when an abnormality occurs in the rotational position sensor 32a and the second PWM control is executed, the rotational position of the rotor of the motor 32 can be estimated from the vehicle speed VS.

In the electric vehicle 20 according to the embodiment, the boost converter 40 is provided between the battery 36 and the inverter 34, but the boost converter 40 may not be provided.

Figure 4:
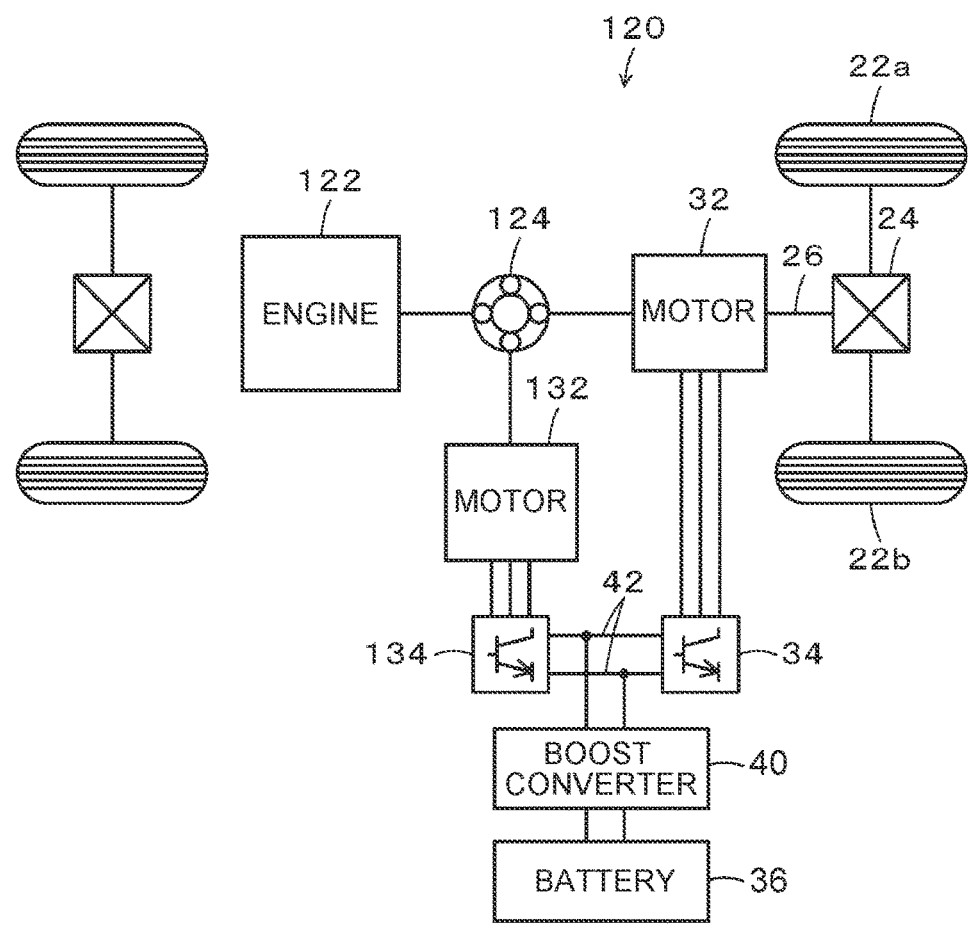
FIG. 4 is a diagram illustrating a configuration of a hybrid vehicle according to a modified example.

The electric vehicle 20 according to the embodiment is configured to include the motor 32, the inverter 34, and the battery 36. However, as in a hybrid vehicle 120 according to a modified example illustrated in FIG. 4, a vehicle may be configured to include an engine 122, a planetary gear 124, a motor 132, and an inverter 134 in addition to the motor 32 and the inverter 34. Here, the motor 132 is connected to a sun gear of the planetary gear 124, the engine 122 is connected to a carrier thereof, and the drive shaft 26 and the motor 32 are connected to a ring gear thereof. The inverter 134 is connected to the motor 132 and is also connected to a high-voltage power line 42.

In the embodiment, the motor 32 serves as the "motor," the inverter 34 serves as the "inverter," the battery 36 serves as the "battery," the rotational position sensor 32a serves as the "rotational position sensor," and the electronic control unit 50 serves as the "electronic control unit."

While aspects of the disclosure have been described with reference to the embodiment, the embodiment is only a specific example of the disclosure. The disclosure is not limited to the embodiment, and the disclosure can be modified in various forms without departing from the scope of the disclosure.

The disclosure is applicable in the vehicle manufacturing industry.

What is claimed is:

1. A vehicle comprising:
a motor configured to drive the vehicle;
an inverter configured to drive the motor by switching a plurality of switching elements;
a battery configured to exchange power with the motor via the inverter;
a rotational position sensor configured to detect a rotational position of a rotor of the motor; and
an electronic control unit configured to perform control of the inverter by switching a plurality of controls including
i) a first PWM control of generating a first PWM signal of the plurality of switching elements by comparison of voltage commands of respective phases based on a torque command of the motor with a carrier voltage and switching the plurality of switching elements, and
ii) a second PWM control of generating a second PWM signal of the plurality of switching elements based on a modulation factor of a voltage and a voltage phase based on the torque command and a number of pulses in a predetermined period of an electrical angle of the motor and switching the plurality of switching elements, wherein the electronic control unit is configured to limit an execution of the second PWM control when an abnormality occurs in the rotational position sensor.

2. The vehicle according to claim 1, wherein the electronic control unit is configured to prohibit the execution of the second PWM control as limiting of the execution of the second PWM control.

3. The vehicle according to claim 2, wherein the electronic control unit is configured to generate the first PWM signal at a first interval when performing the first PWM control and to generate the second PWM signal at a second interval longer than the first interval when performing the second PWM control.

4. The vehicle according to claim 1, wherein the electronic control unit is configured to reduce a torque command range or a rotation speed range of the second PWM control as limiting of the execution of the second PWM control and execute the first PWM control.

5. The vehicle according to claim 4, wherein the electronic control unit is configured to generate the first PWM signal at a first interval when performing the first PWM control and to generate the second PWM signal at a second interval longer than the first interval when performing the second PWM control.

6. The vehicle according to claim 1, wherein the electronic control unit is configured to generate the first PWM signal at a first interval when performing the first PWM control and to generate the second PWM signal at a second interval longer than the first interval when performing the second PWM control.

* * * * *